United States Patent [19]
Dow

[11] 3,825,915
[45] July 23, 1974

[54] CIRCUIT FOR SENSING THE ABSENCE OF A SAFETY GROUND IN AN ELECTRICALLY OPERATED TRANSPORT VEHICLE SYSTEM

[75] Inventor: Ronald C. Dow, Richardson, Tex.

[73] Assignee: Monocab, Inc., Garland, Tex.

[22] Filed: Sept. 20, 1972

[21] Appl. No.: 290,449

[52] U.S. Cl............... 340/256, 246/169 R, 324/51
[51] Int. Cl. ..... G01r 31/02, B611 3/00, G08b 21/00
[58] Field of Search ........ 324/51, 52, 54; 317/18 A, 317/18 B; 340/256; 246/1 R, 1 C, 169 R

[56] References Cited

UNITED STATES PATENTS

| | | | |
|---|---|---|---|
| 2,432,948 | 12/1947 | Thompson | 324/52 |
| 2,440,984 | 5/1948 | Summers | 324/34 R |
| 2,788,486 | 4/1957 | Guggi | 324/51 |
| 2,929,963 | 3/1960 | Kaestle | 317/18 A |
| 3,176,219 | 3/1965 | Behr | 324/51 |
| 3,387,064 | 6/1968 | Joy et al. | 340/256 X |
| 3,659,197 | 4/1972 | Alley et al. | 324/51 |

FOREIGN PATENTS OR APPLICATIONS

| | | | |
|---|---|---|---|
| 178,668 | 10/1935 | Switzerland | 317/18 B |
| 794,106 | 4/1958 | Great Britain | 317/18 B |
| 662,878 | 12/1951 | Great Britain | 317/18 B |

*Primary Examiner*—Gerard R. Strecker
*Attorney, Agent, or Firm*—Olson, Trexler, Wolters, Bushnell & Fosse, Ltd.

[57] ABSTRACT

The embodiment of the invention disclosed herein is directed to a circuit for sensing the absence of a safety ground from electrically operated machines or vehicles. The circuit includes a magnetic frame having first and second magnetic circuit paths extending about the frame with a common circuit portion thereof from which excitation energy is induced into the magnetic frame. A single turn closed loop winding is positioned about one portion of the magnetic frame and a load winding is positioned about another portion of the magnetic frame. During normal conditions, when the closed loop winding is maintained, this indicating good connection for the safety ground, the magnetic flux path is primarily directed about the magnetic frame to maintain maximum excitation of the load winding. This load winding is then connected to a transistor circuit which operates an indicating device of any suitable kind. Upon disconnection of the safety ground, the closed loop winding becomes open circuited and the impedance of the magnetic field in the magnetic frame changes abruptly to cause a substantial reduction in the magnetic circuitry associated with the load winding. This then causes automatic energization of the indicator for indicating that safety ground has been lost.

4 Claims, 5 Drawing Figures

PATENTED JUL 23 1974
3,825,915
SHEET 1 OF 2
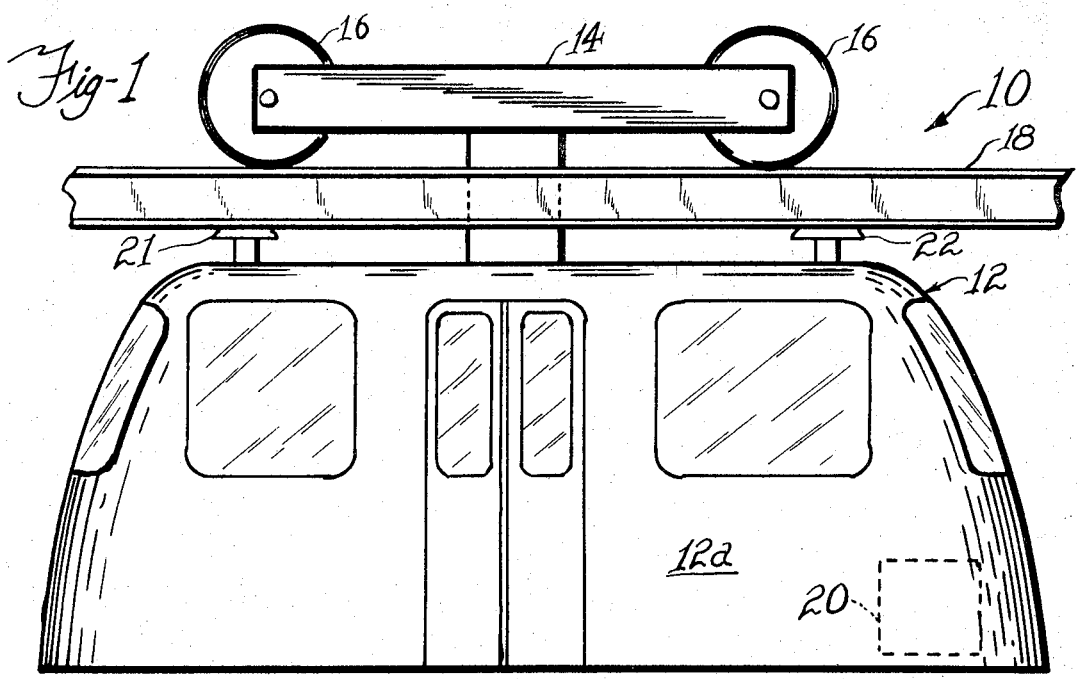
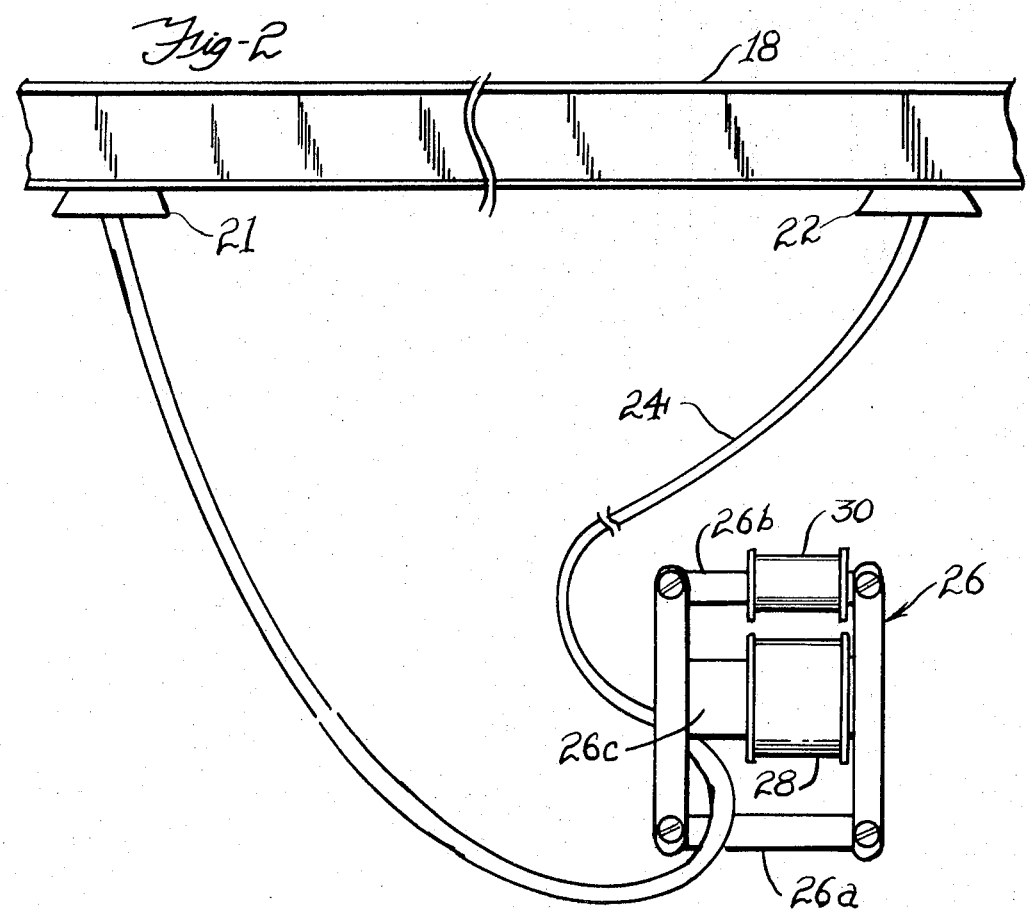

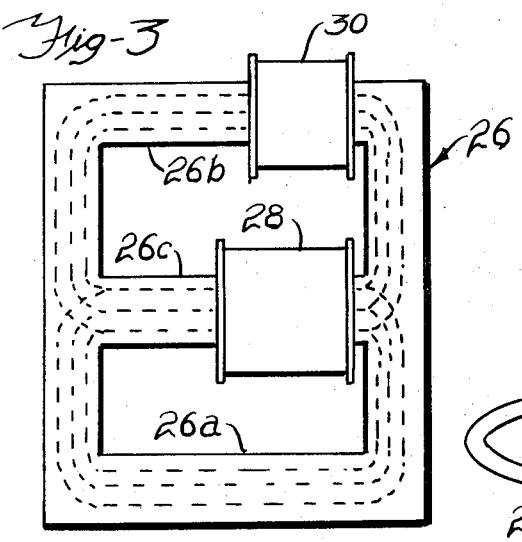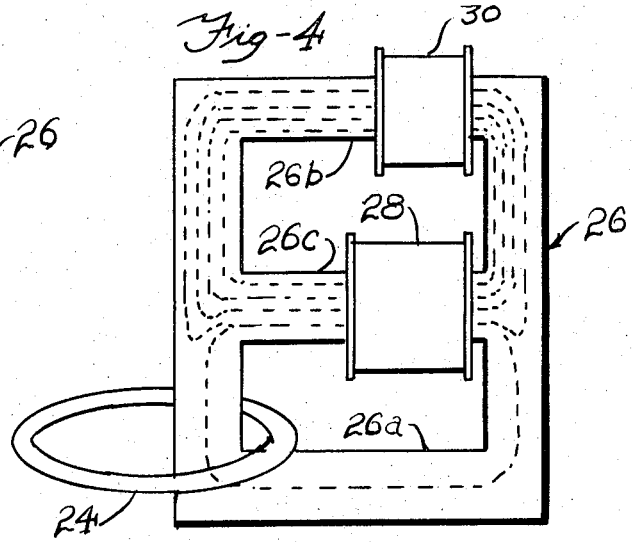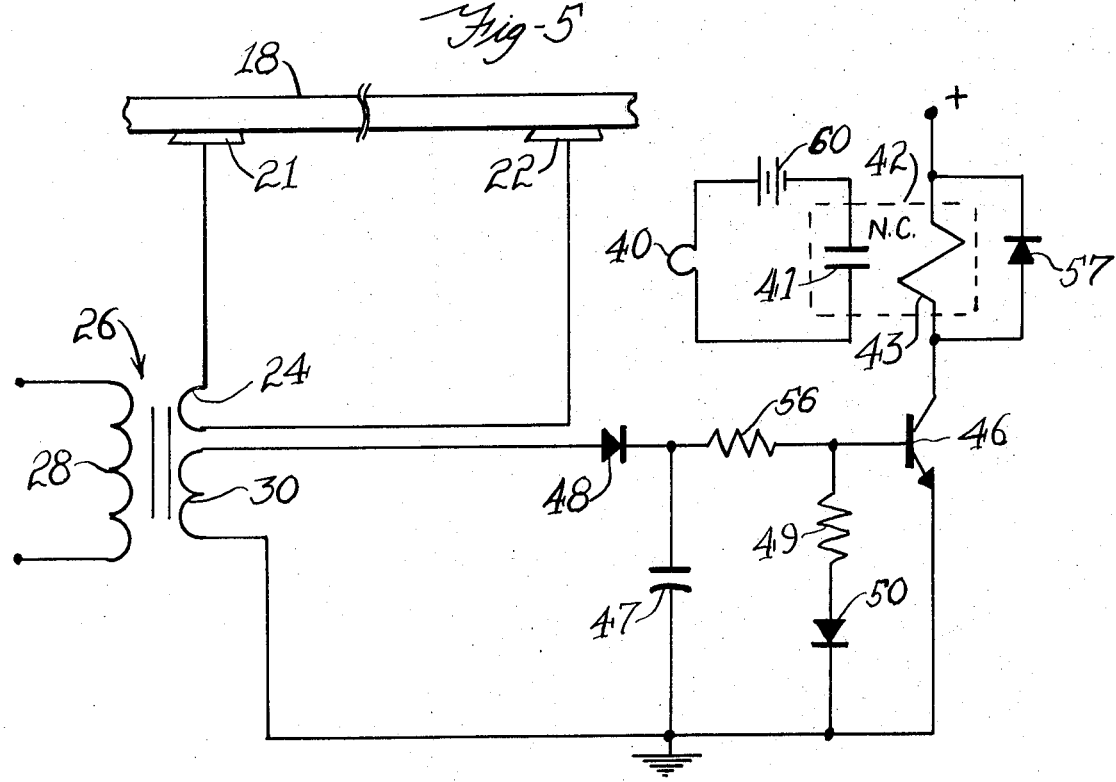

3,825,915

CIRCUIT FOR SENSING THE ABSENCE OF A SAFETY GROUND IN AN ELECTRICALLY OPERATED TRANSPORT VEHICLE SYSTEM

BACKGROUND OF THE INVENTION

This invention relates generally to a circuit for sensing the absence of a safety ground to prevent hazardous conditions for personnel which would otherwise result in serious injury.

In operating electrical equipment requiring high voltage power sources, it is desirable to continuously maintain a safety ground condition between the outer frame of such equipment and the electrical motor circuitry operating the same. This is true in all machinery such as overhead electrical cranes and the like. However, when operating suspended monorail transportation vehicles from high voltage electrical sources, it is particularly important to maintain a safety ground condition at all times because of the large number of passengers that would be subjected to inadvertent injury should the safety ground be removed.

SUMMARY OF THE INVENTION

Accordingly, it is an object of this invention to provide a safety ground indicating circuit which will give a visual indication of the absence of a safety ground to warn personnel of an unsafe condition.

Another object of this invention is to provide a safety ground circuit arrangement for use in electrically operated transport vehicle systems.

Another object of this invention is to provide a safety ground indicating circuit which is efficient and reliable in operation and inexpensive to manufacture.

Briefly, the safety ground indicating circuit of this invention incorporates a simple magnetic transformer frame constructed to provide two distinct magnetic circuit paths with a common leg between them. The common leg is provided with an excitation winding which produces a constant amount of flux to be distributed between the two circuit paths. A load winding is associated with one circuit path so as to provide a transformer coupling of the alternating current induced therein. A closed loop short circuit winding is associated with the other circuit path and thus changes the impedance thereof when in a short circuit condition. The short circuit condition represents good connection between a ground conductor and a safety ground contact or the like. Should the safety ground contacts become dislodged from the ground conductor and an unsafe ungrounded condition exist, the closed loop circuit path is thus opened and the impedance of the magnetic circuit changed. This then causes a reduction in the amount of transformer coupling of the signal into the load winding. The reduced signal of the load winding then changes state of a transistor circuit for energizing an indicator so that the ungrounded unsafe condition is noted.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a side elevational view of a monorail electrically operated transport vehicle system in which the safety ground sensing circuit of this invention is used;

FIG. 2 is a somewhat diagrammatic representation of the sensing transformer used in accordance with this invention;

FIGS. 3 and 4 represent diagrammatically the magnetic circuit paths within the transformer of FIG. 2 during the two states of operation thereof; and FIG. 5 is a schematic circuit of the safety ground indicating circuit of this invention.

DETAILED DESCRIPTION OF THE ILLUSTRATED EMBODIMENT

Referring now to FIG. 1, there is seen an electrically operated transport vehicle system designated generally by reference numeral 10. The transport system 10 includes a monorail bogie 12 depending from an upper transport carriage 14. The transport carriage 14 is provided with wheels 16 to engage a monorail 18 in a manner well-known in the art. The wheels 16 are electrically driven by suitable motor means, not shown, to propel the bogie 12 in either direction. To control movement of the bogie a control circuit 20 is provided therein so that the necessary sequence of operation can take place. The control circuit 20 also includes indicator circuit means for giving either audible or visual indication that loss of a safety ground has occurred.

In a well-known manner, electric motors are energized by AC or DC current to propel the bogie while the chassis 12a thereof, in which passengers are carried, is preferably maintained at ground potential to prevent inadvertent shock hazards to passengers. To insure that the entire chassis as well as the support carriage 14 are maintained at a safety ground potential during operation, a pair of movable contact brushes 21 and 22 engage the underside of the monorail 18 which, in turn, acts as a safety ground terminal connection. This is particularly necessary in instances where the transport wheels 16 are of inflatable rubber, thus being insulated from the monorail 18. Two such safety ground shoe contacts are thus provided to insure absolute safety at all times. If either one of the shoe contacts 21 or 22 should become disconnected from the ground conductor provided by the monorail 18, an indicator is energized to warn passengers, as well as workmen, that an unsafe condition may exist. As mentioned above, only one such shoe contact is needed for absolute safety should a short circuit occur. However, two such shoe contacts provide safety redundancy and also provide means to facilitate monitoring the safety ground.

Referring now to FIG. 2 a simplified diagrammatic representation shows the safety ground contact shoes 21 and 22 engaging the monorail 18 as being connected together by means of a conductor 24, and together with the monorail 18 provided a closed loop short circuit winding for one leg of a sensing transformer 26. The sensing transformer 26 has an excitation winding 28 mounted on the center leg thereof and a load winding 30 mounted on one outboard leg thereof. The closed loop short circuit conductor 24 passes through the other outboard leg of the transformer 26 and, when a short circuit condition exists, i.e., both safety ground contacts 21 and 22 in firm electrical and mechanical contact with the monorail 18, the magnetic impedance of the leg 26a is substantially increased so that maximum magnetic flux passes through the leg 26b thus providing a detectable transformer coupled output signal from the load winding 30.

The magnetic characteristics of the transformer 26 are best illustrated in FIGS. 3 and 4. Preferably, an alternating current signal is applied to the excitation winding 28 so that a given flux pattern indicated by the broken lines will extend from the central leg 26c of the transformer 26 and extend outwardly to both outboard legs 26a and 26b in equal amounts. Since the flux density produced by the excitation winding 28 is constant, any change in magnetic impedance in leg 26a will cause a corresponding change in the magnetic flux passing therethrough. Therefore, if the magnetic impedance is increased by a short circuit loop winding 24 as shown in FIG. 4, the additional flux current from the excitation winding 28 will then pass through the leg 26b of the transformer 26 to increase the magnetic coupling to the load winding 30.

Referring now to FIG. 5, the circuit arrangement used in conjunction with the transformer 26 is here illustrated to provide visual information that a possible unsafe condition exists by the energization of a lamp 40. The lamp 40 is maintained in a deenergized state by the fact that a normally closed pair of contacts 41 of a relay structure 42 are held in an open circuit condition as the result of continuous energization of the holding coil 43. The holding coil 43 receives energizing current therethrough from a power terminal 44 when a control transistor 46 is energized. Control transistor 46 is energized as the result of DC voltage developed on a capacitor 47 from rectifier 48 which is connected in series with the load winding 30 of the transformer 26. This rectified and filtered DC voltage is then applied to the base emitter junction of transistor 46 to maintain the transistor in a continuous conductive state. Temperature compensation for the circuit is provided by means of a series connected resistor 49 and diode 50.

The operation of the circuit shown in FIG. 5 is as follows. Alternating current voltage is applied to the excitation winding 28 to provide transformer coupling therefrom to the load windings 30. As long as the movable contact shoes 21 and 22 are in electrical and mechanical contact with the monorail 18, a closed loop short circuit condition exists. This then causes a magnetic flux condition as shown in FIG. 4 so that maximum flux coupling is provided between the excitation winding 28 and load winding 30. This maximum excitation coupling is then transformed into a DC biasing voltage by the rectifier 48 and capacitor 47 to forward bias the base emitter junction of transistor 46. This maintains the transistor in a continuous conductive condition to energize the holding coil 43 of the relay 42. Upon disconnection of either one of the contact shoes 21 or 22, the magnetic coupling between the excitation winding 28 and the load winding 30 is then shown in FIG. 3, this being a substantial reduction in output voltage of the winding 30. This reduced voltage is then translated in terms of reduced bias to the base emitter junction of transistor 46 to render it substantially nonconductive. Upon deenergization of the holding coil 46, the normally closed contacts 41 of the relay then provide a circuit path for a battery 60 connected to the indicating lamp 40.

A current limiting resistor 56 is connected in series between the rectifier and capacitor circuit so that proper bias current between the base emitter junction of transistor 46 is maintained. As mentioned previously, the series connected resistor 49 and diode 50 function as temperature compensation devices for the transistor 46 so that stable circuit operation is obtained. To eliminate the possibility of extremely short duration disconnection of either of the contact shoes 21 and 22, and to prevent transient voltages from damaging the transistor 46, a reverse current diode 57 is connected in shunt relation with the holding coil 43 of the relay 42 so that upon rapid turnoff of the transistor 46 a reverse current path is provided for the collapsing magnetic field of the holding coil thus maintaining the holding coil energized for a short period of time. This also eliminates the possibility of transient voltages from adversely affecting the operation of transistor 46.

While the safety ground sensing circuit of this invention has particular utility when used in monorail transport vehicle systems as shown herein, it will be understood that this safety ground detection circuit can be used in other electrically operated machinery such as overhead cranes and the like where the presence of a safety ground is imperative for the safety of personnel operating the equipment.

Accordingly, it will be understood that variations and modifications of this invention may be effected without departing from the spirit and scope of the novel concepts disclosed and claimed herein.

The invention is claimed as follows:

1. In an electrically operated transport vehicle system, the combination comprising: a ground conductor, sensing circuit means including an inductive reactance element for providing magnetic circuits, movable contact means providing spaced apart physical and electrical contact elements engageable with said ground conductor and adapted to be moved along said ground conductor, said movable contact means providing a safety ground connection of the transport vehicle with said ground conductor, means for operatively connecting said sensing circuit with said movable contact means to change the state of the magnetic circuits within said sensing circuit when a break in continuity is sensed between said ground conductor and said contact means, and indicator means responsive to said sensing circuit means to indicate that an ungrounded condition exists.

2. The electrically operated transport vehicle system according to claim 1 wherein said inductive reactance element includes a transformer having first, second and third magnetic circuit portions, said first magnetic circuit portion receiving an excitation voltage for producing magnetic circuits within said transformer, said second magnetic portion receiving a load winding responsive to the magnetic circuit associated therewith for producing an output voltage, and said third circuit portion receiving a short circuit loop which is connected to said contact means for providing a high magnetic impedance of said second magnetic portion when said short circuit loop is in a closed loop condition, and for providing a low magnetic impedance of said second magnetic portion when said short circuit loop is in an open circuit condition.

3. The electrically operated transport vehicle system according to claim 2 wherein said load winding is connected to a conductive switching element for operating the same during conditions when said closed loop path is maintained, said current conductive means operatively connected to said indicator means to maintain said indicator in an off condition when said short circuit loop is maintained closed and automatically to render said indicator means operative when said short circuit loop path is opened.

4. The electrically operated transport vehicle system according to claim 1 wherein said reactance means includes a magnetic frame providing two spaced apart magnetic circuits, each magnetic circuit having a common leg therebetween, an excitation winding positioned on said common leg for inducing magnetic flux paths through said two spaced apart magnetic circuits, a load winding connected to one of said two spaced apart magnetic circuits outwardly of said central portion for providing an output voltage sufficient to energize a transistor circuit when the impedance of the other of said two spaced apart magnetic circuits is maintained in a high state, and disconnection of said movable contact means with said ground conductor will cause a change in impedance of said magnetic circuit automatically to indicate the absence of a safety ground.

* * * * *